March 31, 1970 T. YOSHIDA ET AL 3,503,802

HIGH SPEED MANUFACTURING OF RESIN COATED WIRE

Filed April 15, 1966 8 Sheets-Sheet 1

INVENTOR.

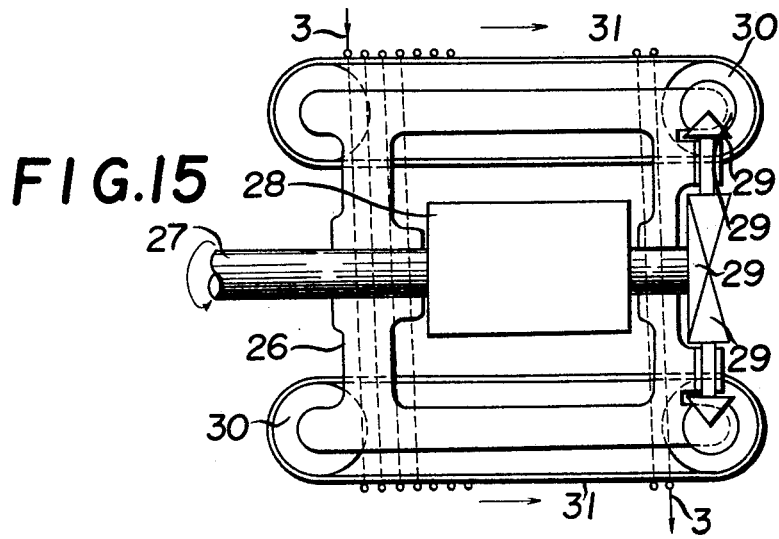
FIG.15
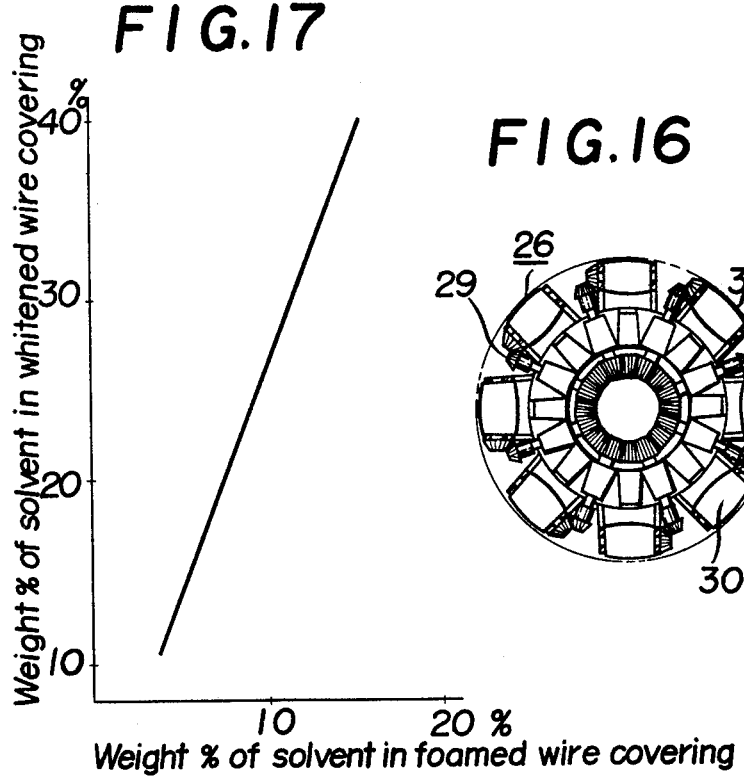
FIG.17
FIG.16

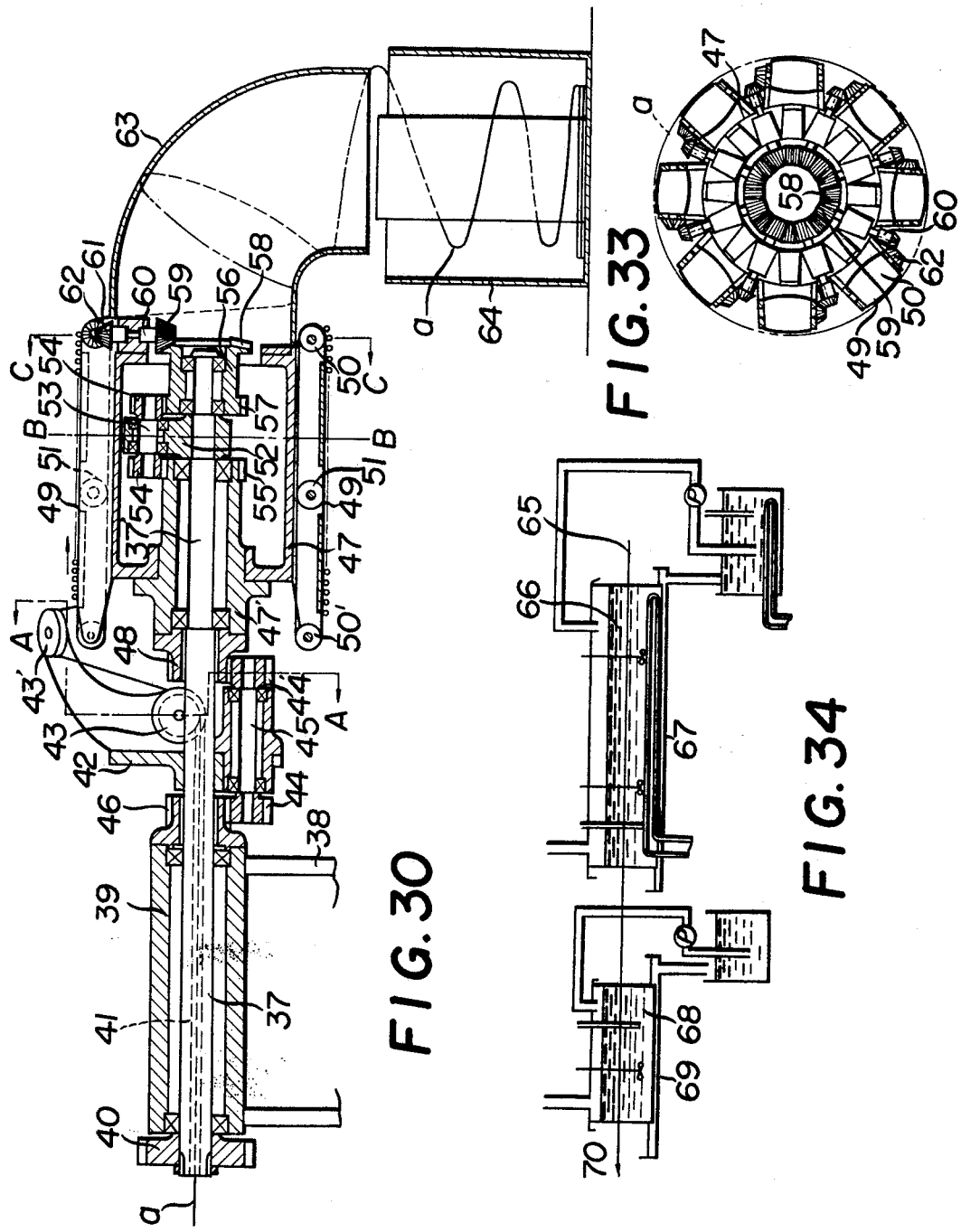

United States Patent Office 3,503,802
Patented Mar. 31, 1970

3,503,802
HIGH SPEED MANUFACTURING OF RESIN COATED WIRE
Tsunemi Yoshida, Tokyo, Masao Azumi, Katsuei Handa, Toshio Saito, and Shigeyasu Shimizu, Yokohama-shi, Nobuji Ito, Tokyo, Koji Yanagisawa, Toshio Matsui, and Takayoshi Maesawa, Ichihara-shi, and Morikuni Hasebe and Hiroshi Yatabe, Yokohama-shi, Japan, assignors to The Furukawa Electric Co., Ltd., Tokyo, Japan, a corporation of Japan
Filed Apr. 15, 1966, Ser. No. 542,833
Claims priority, application Japan, Apr. 19, 1965, 40/23,097, 40/23,099; Apr. 2, 1965, 40/23,333; Apr. 24, 1965, 40/24,214; July 15, 1965, 40/42,252; Sept. 22, 1965, 40/57,986; Oct. 7, 1965, 40/61,476
Int. Cl. B44d 1/42
U.S. Cl. 117—232      12 Claims

ABSTRACT OF THE DISCLOSURE

Method and apparatus of producing resin coated electric conducting wires is disclosed wherein the conductor is coated with a synthetic resin solution, dried while being cooled at a temperature below the clouding point of the resin solution, and heated in a furnace to foam the resin coating. The invention is characterized by a series of steps in which, while being run at a speed of more than 100 meters/min., the conductor is preheated to a temperature 10° to 40° C. lower than that of a crystalline synthetic resin solution, coated with said resin solution, led into an accumulator where it is wound into a plurality of turns under a tension, 10% to 40% of its tensile strength at yielding point, and dried at such temperature as will not deteriorate the resin coating, while being cooled at a temperature below the clouding point of the resin solution, so as to precipitate crystalline resin particles out of the solution.

---

The present invention relates to an improved method of manufacturing covered wire, wherein a crystalline synthetic resin such as polyethylene is coated on electric conducting wire and made to foam.

These covered wires having little hygroscopicity and dielectric loss, and being excellent for communication cable have been manufactured by the conventional process as follows: the electric wire driven from a reel with a flier is soaked in and passed through a coating tank containing a coating resin solution which is prepared by dissolving polyethylene, for example, in an organic solvent. The electric wire so coated is then driven into a vertical drying tower to cool the coated resin solution in air below its clouding point to volatilize the solvent appropriately for the purpose of whitening the coating. This phenomenon, where, in the course of cooling a crystalline synthetic resin liquid, coated at high temperature, the solvent and the resin therein are separated with the result that the transparent layer turns white, is called "whitening" and, the wire having whitened coating which is in an intermediate state required for subsequent foaming is called "whitened wire."

The wire coated by such whitened layer is then driven into a high temperature foaming furnace wherein the layer is foamed by the residual solvent at a high temperature, and is wound up by a wind-up machine. This is the most important point in the process of manufacturing covered and foamed wire when the workpiece having a layer, coated thereon, is cooled below the clouding point for whitening.

In a conventional method of manufacturing the coated and foamed wire, a tall drying tower is used to bring the resin coating onto the conducting wire to an appropriately dry and whitened state. The height of the drying tower affects, to a great extent, the quality of coated wire. In order to get a higher wire driving speed, the drying tower must be extended in proportion to the accelerated wire driving speed (for example, the wire driving speed of 50 m./min. requires a drying tower height of 35 m., and for 100 m./min. speed 70 m. height is required), and that means high costs for tower and building constructions. Thus, in the conventional method, the height of the tower is limited in view of economy and workability such as restoration to normal operation in case of wire breakdown.

For the above described reason, the height of the drying tower is limited by engineering and economical conditions, and the wire driving speed is consequently also limited in order to manufacture coated and foamed wire of excellent quality. For this reason the wire driving speed in the conventional method has been limited to maximum 50 m./min.

An object of this invention is to develop the techniques of driving the coated wire with the speed of more than 100 m./min.

Another object of this invention is to drive the coated wire with a maximum speed of 500 m./min. without using such equipment as a tall drying tower.

The above objects may be attained in accordance with the present invention by using an accumulator for leading said wire under a low tension at the step of whitening to get a production speed of more than 100 meters per minute.

The features of the invention which are believed to be novel are set forth with particularity in the appended claims. The invention itself, however, as to its organization together with further objects and advantages thereof, may best be understood by reference to the following description taken in connection with the accompanying drawings, in which:

FIG. 1 shows a flow process diagram of the conventional method for manufacturing resin coated wire;
FIG. 2 shows a flow process diagram of the method contemplated herein;
FIG. 3 shows a cross-sectional view of resin coated and foamed wire produced under conditions of suitable preheating temperature for the core wire;
FIG. 4 shows a cross-sectional view of resin coated and foamed wire produced under conditions of unsuitable preheating temperature for the core wire;
FIG. 5 shows another view of cross section like FIGS. 3 and 4;
FIG. 6 shows a vertical view of the coated and foamed wire produced by the method contemplated herein;
FIG. 7 shows a cross-sectional view of the wire shown in FIG. 6;
FIG. 8 shows a vertical view of a coated and foamed wire produced under unsuitable tension conditions;
FIG. 9 shows a cross-sectional view of the wire shown in FIG. 8;
FIG. 10 shows a circulating system diagram of the resin solution by the conventional way;
FIG. 11 shows a diagrammatic view of a circulating system of the resin solution by a more efficient way;
FIG. 12 shows a diagrammatic process view of the method contemplated herein illustrating one system of accumulating the leading wire during whitening;
FIG. 13 shows a longitudinal section view of an accumulating pulley used in FIG. 12;
FIG. 14 shows a longitudinal sectional view of another accumulating pulley used in FIG. 12;
FIG. 15 shows a schematic view of an accumulating apparatus of whitening wire;

FIG. 16 shows a schematic view of the combination of plural accumulating apparatuses of whitening wire shown in FIG. 15;

FIG. 17 shows a relation curve between the weight percent of solvent in the whitened wire covering and the weight percent of solvent in the foamed wire covering;

FIG. 30 shows a longitudinal sectional view of a horizontal coiling apparatus used in the step of coiling the produced resin coated wire;

FIG. 33 shows a sectional view along line C—C in FIG. 30; and

FIG. 34 shows a schematic view in the foaming state of the method contemplated herein using a heated liquid substance as a heating medium.

Figure 1:
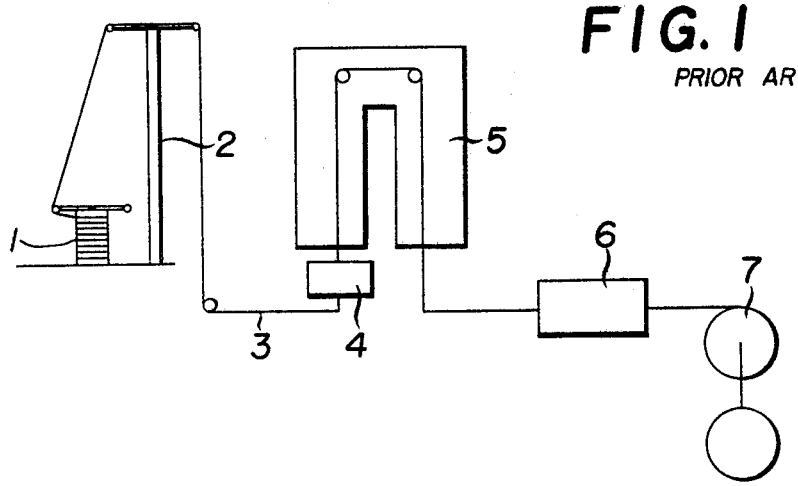

Now we shall once more explain the conventional method of manufacturing the resin coated electric wire according to FIG. 1. The electric wire 3 driven from a reel 1 with a flier through a stand 2 is soaked in and passed through a coating tank 4 containing a coating resin solution which is prepared by dissolving a crystalline synthetic resin, for example polyethylene, in an organic solvent. The electric wire so coated is then driven into a vertical drying tower 5 to cool its coated resin solution in the air atmosphere at a temperature of below its clouding point, to volatilize the solvent appropriately for the purpose of whitening the coating.

The wire coated by such whitened layer is then driven into a high temperature foaming furnace 6, wherein the layer is foamed by a solvent at high temperature. After that, the wire produced is wound up by a winding machine 7.

Figure 2:
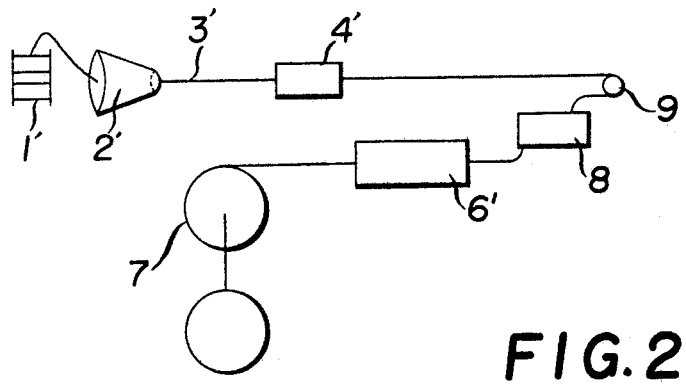

Secondly, we shall explain the manufacturing process herein contemplated according to FIG. 2. The conducting wire 3' from a wire supplying apparatus 1' passes through a bellmouth 2' and is so stretched as to have a tension of from 10 to 40% of the yield tensile strength. The wire is heated at a temperature of from 10 to 40° C. lower than that of the coating solution prepared by dissolving a crystalline synthetic resin such as polyethylene or polypropylene in an organic solvent, for instance xylene, which may dissolve said synthetic resin, and is driven into the horizontal coating tank 4'. Tank 4' is so constructed that, on the main route between the large delivery pump which throws coating liquid in the main resin liquid tank an optional number of branches are arranged in parallel. In each branch there is a small delivery pump, a coating tank with a conducting wire-passing hole and a throttle valve arranged in series so that the wire is soaked in and passed through a coating solution.

The coated wire 3' driven from the coating tank 4' is accumulated in the accumulator 8, and its coating solution on the wire, cooled below the clouding point, is whitened, with a solvent content regulated in a range of from 10 to 35% by weight. The whitened wire so obtained by such whitening process is driven to the high temperature foaming furnace 6' to be heated and foamed by the residual solvent, and wound up by the winding machine 7. The working space is saved if the coated wire is driven by a guide roller 9 so that the coated layer will not be deformed even if the coated wire is bent while being accumulated in the accumulator.

Figure 3:
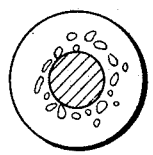
Figure 4:
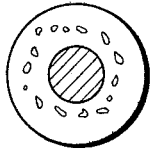
Figure 5:
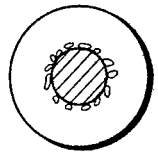

In the present invention, if the preheated temperature of the conducting wire is constantly kept from 10 to 40° C. lower, preferably from 20 to 30° C. lower, than the temperature of the coating solution, the wire finally produced with a coated and foamed resin layer will be of a high quality foaming and evenness as shown by FIG. 3. When the preheating temperature of the wire is kept over 40° C. lower than the temperature of coating solution, only a small amount of foam will grow in the middle of the layer as shown by FIG. 4, and high degree foaming can not be obtained. When the temperature of wire is kept only less than 10° C. lower than that of the coating solution, the foam may grow only on the inner side of the layer and the adherence of the layer to the wire is not strong as shown in FIG. 5.

In the present invention, the temperature of the resin solution varies according to the sort of crystalline synthetic resin and solvent. For example, the temperature of the solution should be from 130° to 135° C. when high density polyethylene is dissolved in xylene, and from 100 to 105° C. when low density polyethylene is dissolved in toluene.

Figure 6:
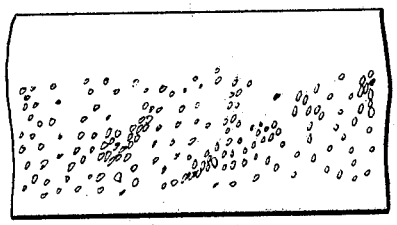
Figure 7:
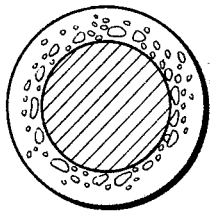
Figure 8:
Figure 9:
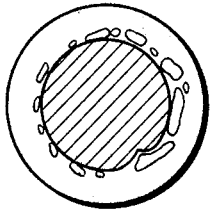

By the present invention, when the tension given to the wire is kept at from 10 to 40%, preferably 20 to 30%, of its breaking point tensile strength, whitened coated wire and foamed coated wire of good quality can be obtained as shown in FIGS. 6 and 7. But when the tension exceeds 40%, the wire coating, as shown in FIGS. 8 and 9, deforms and cracks, thus making it impossible to obtain a coated and foamed wire of good quality. The suitable tension of the wire, when using annealed copper wire, should be from 2.0 to 8.0 kg./mm.$^2$, preferably from 2.0 to 4.0 kg./mm.$^2$, and, when using annealed aluminum wire, that is from 1.0 to 4.0 kg./ mm.$^2$, preferably from 1.0 to 2.0 kg./mm.$^2$ in the present invention.

To carry out such high speed production over 100 m./min. of wire driving speed, a horizontal parallel coating apparatus was devised by us which made it possible to get a high pressure and high speed coating process and a stable operation. This apparatus is so constructed that, on the main route between the large delivery pump which throws up the coating solution to the main resin solution tank a plural number of branches and the main resin solution tank, are arranged in parallel. In each branch is a small delivery pump, a coating tank with a wire passing hole and a throttle valve which are arranged in series and core wire is supplied into each coating tank to coat synthetic resin solvent on it.

Figure 10:
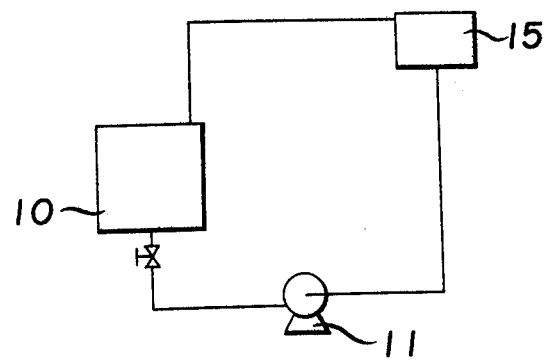
Figure 11:
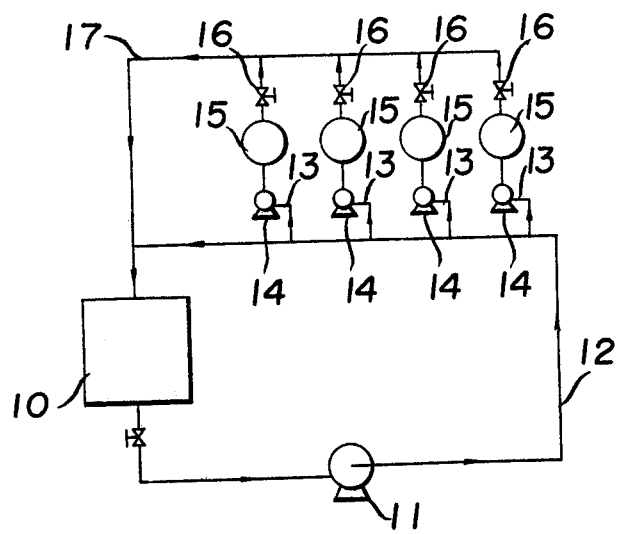

To explain this function referring to FIGS. 10 and 11, the coating solution in a main resin solution tank 10 is driven to the main route 12 by a large delivery pump 11 which is provided at the outlet of the main resin solution tank 10, and circulates therein. On the main route between the large delivery pump 11 and the main resin liquid tank 10, four branches 13, are arranged in parallel and each branch is provided with a small delivery pump 14, a coating tank 15 and a throttle valve 16 in series. The coating solution which circulates in the main route is also circulated to each branch 13, and the liquid from each branch is driven through a returning route 17 to the main resin solution tank 10 together with the circulating liquid in the main route.

The core wire is supplied to each coating tank 15, and passed through the coating tank at a certain speed to reform the coating on the core wire.

In this coating apparatus, a throttle valve 16 is provided on the outlet side of each coating tank 15, which may increase the pressure in the coating tank, and consequently the wire travelling speed may be accelerated to easily carry out high pressure and high speed coating.

The coating tank 15, the small delivery pump 13 and the throttle valve 16 are provided for each core wire, so that if any core wire is torn off, the branch for this core wire has only to be stopped while the necessary repair, and other branches may continue to be operated with good-working conditions.

As the pressure on the outlet side of the small delivery pump 14 provided at each branch 13 is made higher than that on the inlet side (the main route side) thereof, air bubbles in the coating solution rush out to the main route side, and do not enter into the coating tank 15, and this ensures uniform and unbroken coating.

One of the main factors by which the inventors succeeded in high speed manufacturing of resin coated and foamed wire is that the core wire coated by the resin solution is whitened while being accumulated in a wire accumulator, to adjust its solvent content to the range from 10 to 35% by weight, thus eliminating the tall and expensive drying tower which is used in the conventional method.

This wire accumulation whitening step can be attained by stretching the resin solution coated wire between plural pulleys, or by using a special accumulator.

The effects of this accumulation are:

(1) Only a small space is required for whitening and adjusting the solvent content, (2) Whitening of coated wire is facilitated by bending in many turns, (3) The solvent content in the resin solution coated wire may be controlled easily and properly before and after whitening, (4) An excellent whitened wire, i.e. the thickness of whitened layer thereof being very large, can be obtained easily, and (5) Broken wire can be connected very easily.

Figure 12:
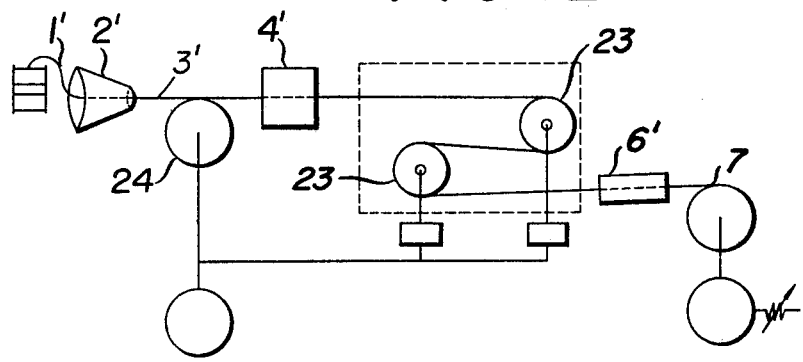
Figure 13:
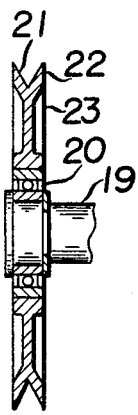
Figure 14:
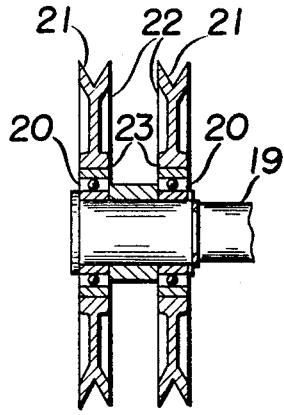
Figure 18:
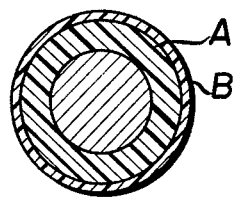
FIG. 18 shows a cross section view of a whitened wire prepared by the method of this invention.
Figure 19:
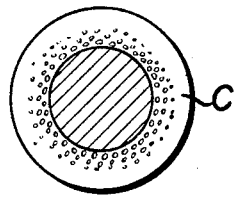
FIG. 19 shows a cross sectional view of the foamed wire prepared by using the whitened wire shown in FIG. 18.
Figure 20:
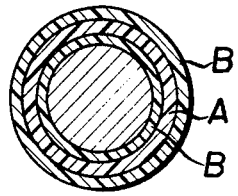
FIG. 20 shows a cross sectional view of another whitened wire prepared by the method herein contemplated.
Figure 21:
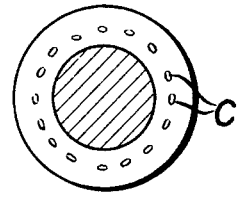
FIG. 21 shows a cross sectional view of foamed wire prepared by using the whitened wire shown in FIG. 20.
Figure 22:
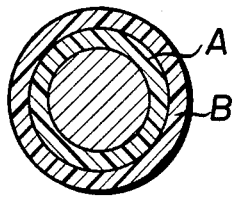
FIG. 22 shows a cross sectional view of still another whitened wire prepared by the method herein contemplated.
Figure 23:
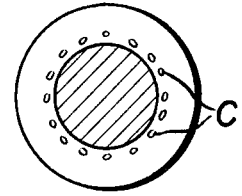
FIG. 23 shows a cross sectional view of foamed wire prepared by using the whitened wire shown in FIG. 22.

To eliminate any damage to the wire in the whitening process by wire accumulation, the inventors worked out one wire accumulating method in which, as shown in FIGS. 12 to 14, the coated wire coming out from a coating apparatus is stretched in a small space, between plural pulleys 23 fitted in a freely rotatable position to the driving shafts 19 by means of ball bearings 20, each pulley consisting of reel 22 with groove 21 around its circumference, each shaft being rotated to regulate the tension of the wire.

According to the above wire accumulating mechanism, shafts 19 are connected electrically to speed-capstans 24 in such a manner that a small frictional force of ball bearings 20 resulting from the rotation of driving shafts 19 makes the rotating speed of the pulleys equal to the travelling speed of the coated wire, and thus controlling the tension of the wire appropriately.

This wire accumulating mechanism has the following advantages:

(1) Since pulleys, even if provided in a large number, do not reduce the takeup force of the wire, it is possible to adjust the tension of the coated wire appropriately in the whitening process, for example, to 500 g. or lower in case of copper wire having a cross sectional area of 0.32 mm.$^2$. The coating effect is therefore improved because such low tension prevents irregular coating due to vibration of the wire in the coating bath, or deformation and damage the coating during the wire accumulation.

(2) As many pulleys can be used in the whitening process of accumulated wire, the space for whitening chamber can be extremely economized.

(3) One operation of changing only the windup tension is enough to establish the control of tension, since the windup tension due to torque motor may extend uniformly to the whole wire.

Further, the inventors have finally devised an accumulator hereinafter described suitable for practicing this method, as the result of various investigations. With the present invention it is possible to use the accumulator devised by the inventors which has a unique structure shown in FIGS. 15 and 16. The accumulator has a cage which is equipped with plural caterpillars having an endless belt and radially forming a hollow cylinder around a shaft, and, as the shaft rotates, the said cage can turn round in the direction in which the shaft rotates and an endless belt can revolve in the lengthwise direction of the shaft. Thus, when the cage 26 of this device revolves around the axis of its shaft 27, the rotation is transmitted to a pulley 30 through a differential gear reduction device 28 and a bevel gear 29. So, the pulley 30 rotates and a belt 31 shifts to the direction of the arrow following to the rotation of the cage 26 to the direction of the arrow. A wire 3 is wound up on the cage 26 which is revolving and, due to the function of the belt 31 which is shifting, the wire 3 is conveyed on cage 26 from the inlet side to the outlet.

During this process the coated layer on the wire is whitened and its solvent content is conditioned, and from the outlet the whitened wire 3 is sent to a foaming furnace 6'. The accumulator of this structure can easily control the duration of whitening treatment, because an amount of accumulated wire in the accumulator can be adjusted voluntarily by suitably regulating the revolving speed of the cage and the shifting speed of the belt.

In the conventional method, a coated wire coming from a coating device has also been whitened and led to a foaming furnace where the whitened coating is foamed at high temperature. It has also been well known that a synthetic resin incapable of producing a whitened layer is not suitable for obtaining a good coated and foamed wire.

As the result of our investigation it has been clearly proved that the carelessly whitened covering is not suitable for good foaming. In the conventional method, from 40 to 45% by weight has been considered to be appropriate for the solvent content in a whitened layer. But there still remains a considerable amount of solvent in the last coated and foamed layer if the wire contains the above mentioned percent of a solvent at the stage of whitening. Since this remaining solvent may gradually evaporate from the layer in a few hours or four or five days the outer diameter of the covered wire becomes thinner and the winding state of the bobbin may get loosened, and also the electrostatic capacity may increase or the mechanical properties may change remarkably as time goes on.

In order to produce a better coated and foamed element wire at high speed, the inventors have investigated a suitable solvent content of a whitened wire and the thickness percentage of a whitened layer to the whole thickness of the resin layer. As a result of the investigation it has been found that when the solvent content in the whitened cover is adjusted to from 10 to 35% by weight and the thickness of whitened layer is stated to ½ of that of coated layer, the coated and foamed wire can get several important characteristics free from the aforementioned defects of the wire made by the conventional method and having a broad range of optimum wire travelling speed, that is good workability and high productivity.

It has been also found that the remaining amount of solvent in the foamed layer is related directly to the solvent content of the whitened layer before entering into a foaming furnace, thus, as shown in FIG. 17, if the solvent content of the whitened layer is over 35% of the weight of its coating, the remaining amount of the solvent in the foamed layer becomes more than 15% of the said coating weight, and the outer diameter of the coated wire shrink and the electrostatic capacity of the foamed wire increase so remarkably that the wire may become inadequate for practical use. It is very important to make the solvent content in a whitened layer less than 35% of the weight of its coating. Further, on the other hand, a part of the solvent contained in the whitened layer may evaporate and perform the function of a foaming agent when the said whitened wire is heated in a foaming furnace.

In order to maintain a good foamed state in a foamed layer, that is to say, minute bubbles being arranged in a multilayer state and distributed evenly in the longitudinal direction, the thickness ratio of the whitened layer to the whole covering is required to be more than 1:2, and in case of less than 1:2 of the thickness ratio, it is impossible to obtain a good foamed wire even though the solvent content is adjusted before foaming within the above mentioned range, because the foaming layer in the said foaming section becomes thinner and the foaming ratio deteriorates. FIGS. 18 through 23 show the above mentioned relation, wherein A indicates a whitened layer, B indicates a transparent resin layer and C indicates a foaming state. The results of these tests are shown in Table 1 wherein polyethylene of high density was used as a resin material.

TABLE I

| | Percentage of whitened layer (A) | Percentage of foaming (C) |
|---|---|---|
| In case the thickness of whitened layer being less than ½ of that of coated layer. | 40% (Fig. 22) (solvent content 30%). | 9% (Fig. 23). |
| | 40% (Fig. 20) (solvent content 28%). | 8% (Fig. 21). |
| In case the thickness of whitened layer being more than ½ of that of coated layer. | 80% (Fig. 18) (solvent content 30%). | 25% (Fig. 19). |

Figure 27:
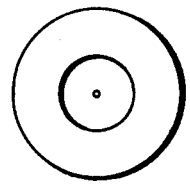
FIG. 27 shows a side view of a conventional heating furnace used in the step of foaming.
Figure 28:
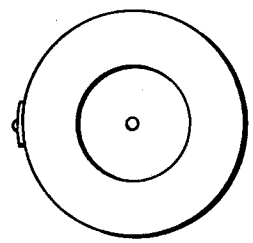
FIG. 28 shows a side view of a conventional heating furnace of the slit type used in the step of foaming.
Figure 29:
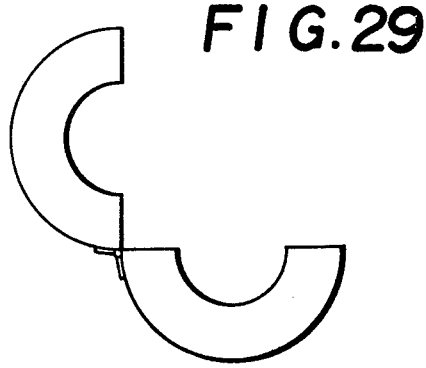
FIG. 29 shows a side view of the conventional heating furnace shown in FIG. 28, and how it is different from FIG. 28.
Figure 31:
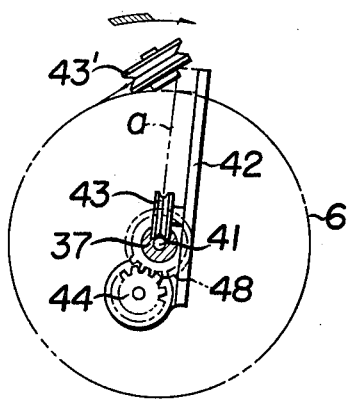
FIG. 31 shows a sectional view along line A—A in FIG 30.
Figure 32:
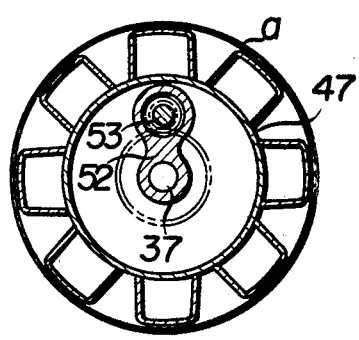
FIG. 32 shows a sectional view along line B—B in FIG. 30.

When carrying out the method herein contemplated for the foaming step as shown in FIG. 27, or FIGS. 28 and 29, the heating furnace must be longer or of a higher temperature type than usual because the traveling speed of the wire is very fast. If the furnace is maintained at a high temperature, or when the production is suddenly stopped for a time, the coated wire may be easily overheated and is liable to cause an accident or a breaking down of the wire coating.

The inventors have devised a special heating furnace for foaming. Thus, in the heating furnace whose opposite ends are open and which is equipped with a lengthwise slit the side of the body inner cylindrical casing whose ends are opened and which is provided also with a lengthwise slit part at the side, and the inner casing can be freely rotated about the coaxis of the furnace body and the inner case. The slit part of the heating furnace is shut by the wall of the inner casing when the heating treatment is applied to the covered wire passing through the inner casing.

Figure 24:
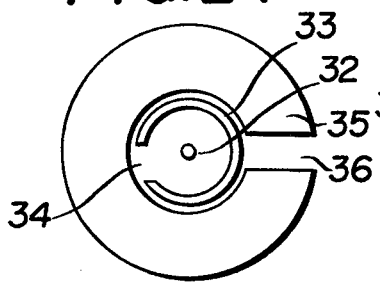
FIG. 24 shows a side view of a novel heating furnace used in the step of foaming according to the method contemplated herein.
Figure 25:
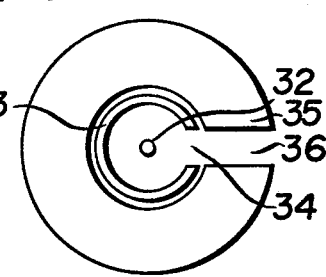
FIG. 25 shows a side view of the heating furnace shown in FIG. 24, emphasizing how it is different from FIG. 24.
Figure 26:
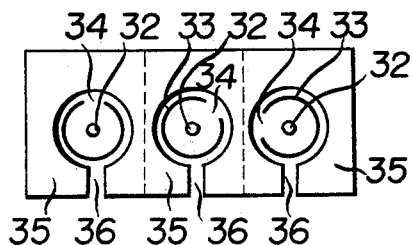
FIG. 26 shows a side view of a multi-wire heating furnace used in the step of foaming according to the method contemplated herein.

As shown in FIGS. 24 through 26, while passing through inner casing 33, a heat treatment is applied to the wire 32 while the temperature and the atmosphere in the inner casing 33 is kept uniform. The position of a slit part 34 of the inner casing is as shown in FIG. 24 in a position remote from the slit part 36 of an outer furnace cylinder 35 so that no open air can penetrate into the inner cylinder 33. When the wire is not required to be in the inner casing 33, such as in the stopped position or at the time of restarting of the wire, the position of the inner case slit part 34 is so disposed with respect to that of the heating furnace slit 36 as shown in FIG. 25 by rotating the inner casing 33, and so the wire 32 can be easily taken out of the heating furnace from both slit parts. When starting the heating operation again, the wire is put in the inner casing from both slits, and is again brought to the position as shown in FIG. 24.

In case of treating several wires simultaneously, the wires 32 are inserted from the slits 36 of the heating furnace 35 and the slits 34 of the inner casing 33, and are operated in the same manner as in the above, as shown in FIG. 26.

The structure of this heating furnace is simple that the operation is not complicated, and any accidental overheating, burning or breaking down of the coated layer can be avoided.

Still another method of heat treatment for foaming by the high speed production of the present inventive method is shown in FIG. 34. Thus the whitened wire 65 is heated and foamed when led to a heating tank 67 containing a heated medium 66 such as glycerine, and then passes through a washing tank 69 containing washing liquid 68 such as water or alcohol. According to this method the heating efficiency may become very high, and the heating and the foaming can be performed at a comparatively low temperature by passing the wire through the medium of liquid heated at a higher temperature than the melting point of the synthetic resin for coating.

The inventors also devised an apparatus for coiling the coated wire produced speedily by the contemplated method. The mechanism of this coiling device is as follows according to FIGS. 30 through 33. In FIG. 30 showing longitudinal section of this coil winding device, a shaft 37 of rotation erected in the bearing box 39 of the machine frame 38 is driven by a motor through the transmission gears by means of the pulley or the gear 40 provided at the end of the shaft of rotation itself. The coated wire $a$ is fed from the back end of the rotation shaft 37 through the center hole 41 of the same shaft, and pulled out along guide wheels 43 and 43′ provided at the flyer 42 on rotation shaft 37. Epicyclic gears of the same diameter 44 and 44′ are provided at both ends of shaft 45 supported on the flyer 42 in parallel with the rotation shaft 37. One of the epicyclic gears 44 engages with the gear 46 fixed at the end of the bearing box 39 of the above mentioned machine frame 38, while the other 44′ engages with the gear 48 at the end of the shaft tubing 47′ of the body 47 loosely inserted into the extended part 37′ of the rotation shaft 37.

Under this condition, the body 47 is stationary with respect to the rotation shaft 37. Conveying belts 49 are provided in the direction of the shaft and around the body 47 and are stretched between the pulleys 50 and 50′ extending between front and rear, and a tension pulley 51 is provided midway for compensation. At a top of the crank 52 fixed at the extended part 37 of the rotation shaft 37 there is a crank-pin 53 equipped to freely turn. At both ends of the crank-pin, there are fixed the epicyclic gears 54 and 54′ with a different number of teeth, one gear 54 engages with fixed gear 55 provided on the above mentioned shaft tubing 47′, while the other gear 54′ engages with gear 57 located on the rotary tube 56, loosely inserted into rotation shaft 37, so that the turning of the rotation shaft 37 may be transmitted to the rotary tube 56 so as to rotate it with extremely low speed. The bevel gear 58 is formed at the shaft end of the rotary tube 56. Bevel gears 62 are provided on the shafts of the pulleys 50 of each conveying belt 49 are driven by bevel gears 61 at one end of shafts 60, at the other ends of these shafts there are provided bevel gears 59 engaging with bevel gears 58. A bend-shaped guide 63 is connected with the front end of the body 47, and under the guide 63 a basket 64 is provided for receiving the coiled wire.

In this device, as the rotation shaft 37 revolves, the wire $a$ pulled out from the center hole 41 of the rotation shaft may be wound up around the conveying belt 49 by the rotation of the flyer 42. At this time, since the epicyclic gears 44 and 44' of the same diameter, which are fixed to each other and revolve around the fixed gear 46, move around the other gear 48, the body 47 is put in a stationary position. Then, each of the conveying belts 49 is simultaneously given a motion in the direction of the arrow in FIG. 30 through the bevel gears by the rotary tube 56 which revolves at a low speed due to the turning of the rotation shaft 37 through the differential epicyclic gear device. Thus, the wire $a$ rolled up in the conveying belt 49 may shift forward and be coiled, and then the tip may move out of the conveyor belt 49, slide down around the bend-shaped guide 63 and be received and piled up in the basket 64 with an opening at the upper end.

By the coiling device above mentioned, the wire rolled up in the conveying belt is sent forward by the movement of the conveying belt, so that it can be formed into a coil without sustaining any damage caused by friction at the time of winding.

The following specific examples are given by way of illustration, and are not to be construed as limiting in any way the scope and spirit of the invention. All parts and percentages are by weight.

EXAMPLE 1

A whitened resin coated wire produced in such a manner that an annealed copper wire having a diameter of 0.32 mm., traveling with the speed of 350 m./min., preheated at 110° C. and kept under the tension of 400 gr., was coated with xylene solution (concentration 31.3%, temperature 133° C.) of high density ethylene-propylene copolymer (melt index 0.32, density 0.949 g./ml.) through a die having a diameter of 0.85 mm. and under the pressure of 5 kg./cm.$^2$ by a 4-wire coating device as shown in FIG. 11. Then the wire coated by the resin solution was stretched for whitening between the pulleys of a multiple-pulley type accumulator composed of two units, provided at 7 m. intervals, of fifteen pulleys, each 32 cm. in diameter, having the structure shown in FIG. 13 and installed on the shaft driven at the peripheral speed of 350 m./min. The sampling of the coated wire after accumulating showed that the solvent content and the thickness percentage occupied by the whitened layer were respectively 28% and 90%. The whitened wire was then led to the cylindrical electric foaming furnace, of 12 cm. total length as shown in FIG. 24 and kept at the temperature of 450 to 500° C., and foamed there to be made into a foamed resin covered wire of 0.48 mm. outer diameter which was then wound on a vertical coiling basket takeup device.

The foamed synthetic resin covered wire had a smooth surface and the coated layer included minute and independent foams as shown in FIG. 7, with the remaining solvent of 10%, foaming ratio of 25% and the electrostatic capacity of 270 pf./m. (picofarads/meter). The change with time of outer diameter and the electrostatic capacity of the wire examined three days later were each less than 5% respectively.

EXAMPLE 2

An annealed copper wire of 0.4 mm. diameter, travelling with the speed of 200 m./min., preheated at 90° C. and kept under the tension of 300 gr., was coated with toluene solution (concentration 37%, temperature 105° C.) of low density polyethylene (melt index 0.3, density 0.928 g./ml.) through the die having diameter of 1.05 mm. and under the pressure of 5 kg./cm.$^2$ by a 2-wire coating device. Then the wire coated by a resin solution was wound up for accumulating on the endless belts of the accumulator equipped with a cage of 80 cm. diameter which revolved at the speed of 80 r.p.m. and was provided radially with 8 units of the said endless belt of 100 cm. length, having a structure such as shown in FIG. 15 travelling with the speed of 90 cm./min. The whitened wire so obtained by accumulating the coated wire was led to the cylindrical electric foaming furnace, of 12 cm. total length as shown in FIG. 24 and kept at the temperature of 450 to 500° C., and foamed there to be made into a foamed resin covered wire of 0.6 mm. outer diameter which was then wound up on an endless belt-type coiler as shown in FIG. 30. The sampling of said coated wire after accumulating showed that the solvent content and the thickness percentage of the whitened layer were 20 to 87%, respectively.

The foamed resin covered wire thus obtained had a smooth surface, and the coated layer had minute and independent foam sections with the remaining solvent of 8%, foaming ratio of 30% and the electrostatic capacity of 200 pf./m. The change with time of outer diameter and the electrostatic capacity of the wire examined three days later were each less than 3% respectively.

EXAMPLE 3

An annealed copper wire of 0.32 mm. diameter, travelling with the speed of 150 m./min., preheated at 105° C. and kept under the tension of 400 gr., was coated with xylene solution (30% concentration, temperature 135° C.) of crystalline polypropylene (melt index 0.7, density 0.910 g./ml.) through a die having a diameter of 0.85 mm. and under the pressure of 6 kg./cm.$^2$ by a 4-wire coating device as shown in FIG. 11. And then the coated wire thus obtained was stretched for accumulating between the pulleys of a multiple-pulley type accumulator composed of two units, provided at 5 m. intervals, of fifteen pulleys each 32 cm. in diameter, having such structure as shown in FIG. 13 and installed on the shaft driven at the peripheral speed of 150 m./min. The whitened wire obtained by accumulating said coated wire was led to a cylindrical electric heating furnace, of 12 cm. total length as shown in FIG. 24 and kept at the temperature of 350° to 450° C., and foamed there to be made into a foamed resin covered wire of 0.49 mm. outer diameter, which was then wound on a bobbin wind-up device. The sampling of said coated wire after accumulating showed that the solvent content and the thickness percentage of the whitened layer were 25% and 80%, respectively.

The foamed resin covered wire thus obtained had a smooth surface, and the coated layer had minute and independent foams with the remaining solvent of 10%, foaming ratio of 25% and the electrostatic capacity of 165 pf./m. The change with time of outer diameter and the electrostatic capacity of the wire examined three days later were each less than 5% respectively.

EXAMPLE 4

An annealed copper wire of 0.32 mm. diameter, travelling with the speed of 250 m./min., preheated at 105° C. and kept under the tension of 500 gr., was coated with xylene solution (concentration 33.3%, temperature 133° C.) of high density ethylene-butene copolymer (melt index 0.3, density 0.947 g./ml.) through the die having diameter of 0.85 mm. under the pressure of 6 kg./cm.$^2$ by a 4-wire coating device as shown in FIG. 11. And then the coated wire thus obtained was stretched for accumulating between the pulleys of a multiple-pulley type accumulator composed of two units, provided at 7 m. intervals, of fifteen pulleys, each 32 cm. diameter and, having such structure as shown in FIG. 13, and installed on the shaft driven at a peripheral speed of 150 m./min. The whitened wire obtained by accumulating said coated wire was heated and foamed through the heated medium of glycerine at the temperature of 135° C. in a heating device 67 as shown in FIG. 34, and then was washed by methyl alcohol in a washing tank to be made into a foamed resin covered wire of outer diameter 0.48 mm., which was wound up by bucketting through a belt-type coiler of such structure as shown in FIG. 30. The sampling of said coated wire after accumulating showed that the solvent content and the thickness percentage of the whitened layer were 33% and 90%, respectively.

The foamed synthetic resin covered wire thus obtained had a smooth surface, and the coated layer had minute and independent foams with the remaining solvent of 12%, foaming ratio of 30% and the electrostatic capacity of 260 pf./m. In addition, the change with time of the outer diameter and the electrostatic capacity of the wire examined three days later were each less than 5% respectively.

A comparative example:

An annealed copper wire of 0.32 mm. diameter, travelling with the speed of 50 m./min., preheated at 75° C., was coated with xylene solution (concentration 31.3%, temperature 133° C.) of ethylene-propylene copolymer (melt index 0.3, density 0.498 g./ml.) under the pressure of 0.3 kg./cm.² by a conventional multiwire coating device which was connected with a storage tank and equipped on the upper surface at 5 cm. intervals with ten dies of 1.05 mm. diameter, and then the coated wire thus obtained was passed through for whitening in an air circulating drying tower of 35 m. tall. Then the whitened wire thus obtained was passed into a heating furnace of 5 m. length, regulated temperature being 350° to 420° C., and foamed there to be made into a foamed resin covered wire of 0.5 mm. outer diameter, which then was wound up on a bobbin.

The foamed resin covered wire thus obtained had a smooth surface, but the foaming state of the coated film had comparatively large and irregular foams with the remaining solvent of 20%, foaming ratio of 16% and the electrostatic capacity of 275 pf./m. Moreover, the change with time of the outer diameter and the electrostatic capacity of the wire examined three days later were 5% and 15%, respectively.

The method under the present invention also can be used for the other crystalline synthetic resin than the resins adopted in the above examples, and to improve the physical characteristics of the coating, another suitable synthetic resin material (for instance polyisobutylene) of less than ten weight percent may be added to the said synthetic resins. Further, an expected wire can be produced even if some amount of coloring agent, resistor, antioxidant or else are added to the said resin materials.

As obvious by the above mentioned explanation, the important reasons why a foamed resin covered wire having various excellent characteristics can be produced successfully at such high speed as more than 100 m./min., especially maximum to 500 m./min., by the present method because of the method of accumulating a coated wire in low tension, and of adjusting the solvent content in the whitened layer instead of the conventioal drying-tower system employed hitherto.

The method of the present invention has important industrial value, because it can produce the foamed resin covered wire having superior characteristics with a very high speed.

What is claimed is:

1. In the method of manufacture of resin coated electrical wire wherein the wire is caused to travel along a travelpath having treating stations along said path, the wire receiving a solvent-containing resin coating at a coating station, then, said resin coated wire being partially dried at a whitening station where the partially dried coating is whitened as it cools and solvent volatilizes, next the wire is passed through a heating station wherein said whitened coating is foamed, and finally said coated finished wire is wound at a winding station, the improvement therein wherein said wire is passed to said whitening station at a tension of between about 10% to about 40% of its tensile strength at the breaking point and accumulated in said whitening station by passing said wire over an endless belt rotating in a conveying pattern about a first set of axes while rotating said conveying pattern about a second axis normal to said first set of axes.

2. The method of claim 1, including the step at the coating station of heating a resin solution thereat to a temperature of between about 100° C. to about 135° C., and the step of passing the wire through a preheating station before arriving at said coating station wherein said wire is preheated to a temperature of between about 10° C. lower and about 40° C. lower than the temperature of said coating material.

3. The method of claim 1 including the step at said coating station of providing thereat a whitening resin having a solvent therein, the amount of solvent being from about 10% to about 35% by weight of said resin, and, the resin being so whitened that the ratio of whitened layer of resin to the whole layer of resin is at least one part in two.

4. The method of claim 1 including at the coating station the step of passing the wire through a plurality of coating tanks, separately pumping into said coating tanks a bubble-free resin.

5. The method of claim 4 including passing said wire through at least three coating tanks.

6. A method of manufacturing an electric wire covered with a foamed resin layer, comprising the steps of driving the wire at a speed of more than 100 meters/minute, preheating the wire to a temperature in the range 10° C. lower to 40° C. lower than that of a solution of a crystalline synthetic resin, coating the preheated wire with said solution, passing the coated wire to an accumulator where it is wound under a tension within the range 10–40% of its tensile strength at its breaking point into a plurality of turns, cooling and drying the coating during wire accumulation to precipitate from solution, crystalline resin particles; the said steps forming a coating with two layers consisting of a whitened layer and a transparent layer, wherein the thickness of the first mentioned layer is more than 50% of the whole thickness of the coating and the solvent content in said coating is reduced to not more than 35% of weight of the coating, and wherein the coating thus formed is subsequently heated to volatilize the solvent remaining therein to provide a foamed structure within the coating.

7. In the method of manufacture of resin coated electrical wire wherein the wire is caused to travel along a travelpath having treating stations along said path, the wire receiving a solvent-containing resin coating at a coating station, then, said resin coated wire being partially dried at a whitening station where the partially dried coating is whitened as it cools and solvent volatilizes, next the wire is passed through a heating station where said whitened coating is foamed, and finally said coated finished wire is wound at a winding station, the improvement therein wherein said wire is passed to said whitening station at a tension of between about 10% to about 40% of its tensile strength at the breaking point and caused to travel along an almost endless path of travel so as to accumulate said wire at said whitening station, the path being such that after the wire travels in a first direction for a short distance it doubles back towards the point of entry to said station and then redoubles back to the first direction to increase the travel path at said station.

8. An apparatus for the manufacture of a resin coated wire, said apparatus including a travel path for said wire and wire treating stations therealong, said apparatus comprising in combination:

(a) tension means for receiving the wire and for imparting a predetermined tension to said wire, said tension being from about 10% to about 40% of said tensile strength at the breaking point;

(b) a coating station to which the wire is fed from the tension means including a main tank for holding a resin, a main flow line connected to said main tank at both ends, a main pump coupled into said main flow line to circulate a resin and a plurality of branch lines in parallel in said main flow line, each branch line including a separate branch tank and branch pump;

(c) a whitening station receiving the new coated wire from the coating station including a cage, belting supported by said cage for conveying around a first set of axes, first drive means for driving said belting and second drive means for rotating said cage around a second axis normal to said first set of axes;

(d) a furnace station receiving the now whitened wire to heat said traveling wire and coating;

(e) a winding station receiving the finished wire including winding means to loop and store said wire.

9. An apparatus as claimed in claim 8, said furnace station including inner and outer cylinders, said cylinders each having a longitudinal slit, one of the cylinders being rotatable with respect to the other cylinder so that the wire can be passed therein and then shielded from the outside by rotating said one cylinder.

10. In an apparatus for the manufacture of a resin coated wire, said apparatus including a travelpath for said wire, a coating station for coating said wire with a resin, a whitening station for drying said resin, a furnace station receiving said whitened resin-coated wire to heat and foam said resin, and a winding station receiving the finished wire including winding means to loop and store said wire, the improvement therein wherein said coating station includes a main tank for holding a resin, a main flow line connected to said main tank at both ends, a main pump coupled into said main flow line to circulate a resin and a plurality of branch lines in parallel in said main flow line, each branch line including a separate branch tank and branch pump.

11. In an apparatus for the manufacture of a resin coated wire, said apparatus including a travelpath for said wire, a coating station for coating said wire with a resin, a whitening station for drying said resin, a furnace station receiving said whitened resin-coated wire to heat and foam said resin, and a winding station receiving the finished wire including winding means to loop and store said wire, the improvement therein, comprising in combination, (a) at said coating station, a main tank for holding a resin, a main flow line connected to said main tank at both ends, a main pump coupled into said main flow line to circulate a resin and a plurality of branch lines in parallel in said main flow line, each branch line including a separate branch tank and branch pump; and, (b) at said whitening station which receives said resin coated wire from said coating station, a cage, belting around said cage for rotation around a first set of axes, first drive means for driving said belting, and second drive means for rotating said cage around a second axis normal to said first set of axes.

12. In an apparatus for the manufacture of a resin coated wire, said apparatus including a travelpath for said wire, a coating station for coating said wire with a resin, a whitening station for drying said resin, a furnace station receiving said whitened resin-coated wire to heat and foam said resin, and a winding station receiving the finished wire including winding means to loop and store said wire, the improvement therein wherein said winding station comprises, a shaft with an open end and an aperture at least partially therethrough for the longitudinal passage of said wire therethrough, a substantially cylindrical support at the end of said shaft opposite said open end, said shaft being journaled in said support; longitudinal endless belts each disposed around said support for conveying in a plane parallel to the axis of said shaft; guide rollers mounted on said shaft and outwards of the shaft towards said belts disposed for rotational motion around said support so as to loop said wire passing through said shaft around said belts, the movement of said belts conveying the wire forward spirally towards a storage section; and, a storage section past said belts for receiving said spirally coiled wire therein.

References Cited

UNITED STATES PATENTS

| 2,388,591 | 11/1945 | Andreas | 242—47.13 |
| 2,576,233 | 11/1951 | Lorig | 242—47.13 |
| 2,237,315 | 4/1941 | Reilly | 117—128.4 X |
| 2,381,398 | 8/1945 | Bosomworth. | |
| 2,386,818 | 10/1945 | Seavey | 117—232 X |
| 2,640,663 | 6/1953 | Leland | 242—155 |
| 3,064,073 | 11/1962 | Downing et al. | 264—47 X |
| 3,068,126 | 12/1962 | Rokunohe et al. | 117—232 |

ALFRED L. LEAVITT, Primary Examiner

C. R. WILSON, Assistant Examiner

U.S. Cl. X.R.

72—66; 117—62, 66; 118—405, 420, 429